UNITED STATES PATENT OFFICE.

ANTHONY R. SANNA, OF CHEVY CHASE, MARYLAND, ASSIGNOR TO GEORGE P. SACKS, OF BRADLEY HILLS, MARYLAND.

PROCESS FOR MAKING ICE-CREAM MIX.

1,415,715.　　　Specification of Letters Patent.　　Patented May 9, 1922.

No Drawing.　　Application filed November 15, 1921. Serial No. 515,338.

*To all whom it may concern:*

Be it known that I, ANTHONY R. SANNA, a citizen of the United States of America, residing at Chevy Chase, in the county of Montgomery and State of Maryland, have invented certain new and useful Improvements in Processes for Making Ice-Cream Mix, of which the following is a specification.

This invention relates to an improved process for making ice cream mix of sufficient body, without the use of artificial fillers, by creating the desired consistency through treatment of the normally inherent constituents of the mix.

It has been heretofore attempted to produce a commercial ice cream without the use of the usual body-forming ingredients, as gelatine, glue, or the like, but difficulty has been experienced in producing a final product having the essential characteristics demanded by the trade, such as a proper body or consistency, smoothness, a mellow body and taste, and one which will not break or become separated. This difficulty I believe can be largely attributed to the fact that the distinctive agents heretofore employed to act on or affect the casein in converting the same into a state where it will take the place of a filler, together with the time of treatment and the temperature usually employed to produce the result, destroy the natural physical characteristics of the casein particles and to some extent renders them hard, producing an undesirable condition in the ice cream mix in final form. Furthermore, in some such processes, it has been deemed advisable in the treatment of the milk to separate the whey from the casein, and subsequently bring them together after special treatment; or in some cases entirely eliminate the whey.

I have discovered that whole milk can be treated to produce a separation of the casein particles from the other constituents of the milk and at the same time enlarge such particles, to thereby form a semi-fluid mass, and that the character of this mass will to some extent depend upon the relative proportions of the casein particles and of the treating agent, with, in any event, a well defined viscosity as the ultimate and direct result of this treatment of the casein particles.

I have further discovered that after the casein particles have been brought to this ultimate and definite condition, as for example by a chemical change therein, such changed casein particles can best be treated and broken up into what may be defined as a homogeneous mass by a purely mechanical treatment.

In carrying out the present process, a predetermined quantity of ice cream mix ingredients, including whole milk, sugar, or powdered milk, if desired, are poured into a pasteurizer, and while the mixture is kept under agitation, a pasteurizing temperature is maintained, say about 160° F., or varying between 130° F. and 212° F., for a sufficient length of time, as from 10 to 40 minutes. Attention is called to the fact that in accordance with the terms of this process, the mixture being pasteurized, is, or may be, what is known as a standard ice cream mix, that is, one containing the requisite amounts of solids, liquids, sugar, et cetera, necessary to make ice cream in accordance with the legal restrictions or the trade demands.

After the mixture has been pasteurized, the temperature is reduced to between 70° and 120° F., while still maintaining the necessary agitation. At this reduced temperature, and without interrupting the agitation, enzyms, preferably in the form of sterilized pepsin, are introduced. The pepsin in liquid form is worked into the entire mixture by the agitation, and will gradually change the character of the casein particles to enlarge the same and cause a collection thereof into groups, thus increasing the viscosity of the mixture. It has been found that this chemical affinity of the casein for the enzyms, or vice versa, follows and produces a definite change in the casein particles, which enzymatic activity so called continues until an enlargement and collection of the casein particles results to a very noticeable degree. This enzymatic action has a definite range or scope, and is for the purpose of this invention, generally permitted to continue under the conditions named until the enzymatic activity is substantially limited or has ceased. At this stage, the mixture, without substantial change in temperature, is pumped from the pasteurizer through a homogenizer.

The homogenizer acts as a mechanical interrupter of the condition resulting from the enzymatic activity and to break up or virtually atomize the enlarged casein particles after pasteurization and immediately following the enzymatic activity referred to. This homogenization, at this particular period in the treatment, is one of the important steps of the process.

It is to be understood that the mix as delivered to the homogenizer is chiefly whole milk with the casein particles and like constituents thereof enlarged and united in groups as a result of the enzymatic activity, these groups under the microscope resembling a plurality of gelatinous balls clinging together and floating in the liquid constituents of the milk.

Following the homogenization referred to, the casein particles are by such action separated as to groups and broken up into small atoms and scattered, with the result that they are so intimately mixed with the other constituents of the milk as to form a substantial emulsion. It has been found, as a result of my discoveries, that the casein particles while and during their change incident to the activity of the enzyms, and at or about the time of the completion of the enzymatic activity, are more readily broken up and reduced to a substantially homogeneous mass by the homogenizer than if such breaking up were attempted at any other time in the make up of the mix. While it is desirable to homogenize at this time, an excellent product can be obtained if the enzyms are permitted to complete their activity and the mass sets for a while, and then homogenized.

From the homogenizer the mixture is conveyed to the coolers, where the temperature is reduced at approximately 40° F. This temperature is sufficient to prevent any subsequent deterioration of the mix. From the coolers the mix is conveyed to the aging tanks, where it is retained for ripening, for the making of ice cream.

Ice cream mix made in accordance with my improved process possesses many advantages over known processes, as it eliminates many steps heretofore believed necessary; it combines a semi-chemical and mechanical action, to first prepare the casein and other particles to form in the mix a substantial filler which will stand up, and which can be readily subjected to a mechanical treatment to form an emulsion; and it effectually serves to maintain the mix in an emulsified state, or a state wherein the casein is converted into a smooth filler.

The improved process may thus be more specifically stated as treating a milk mixture to enlarge the casein and like particles to substantially a state of agglomeration, and thereafter subjecting the treated milk to a homogenizing action to arrest further agglomeration. In the use of the term agglomeration herein, there is more specifically meant the massing or clustering of the casein particles, without any particular mutual adherence due to their treatment, and hence agglomeration as used herein and in the claims has reference only to this general massing or assemblage of the particles.

Ice cream made from my improved process is firm and smooth, and will stand higher temperature than an ice cream made with the usual commercial fillers.

Having thus described the invention, what is claimed is:

1. The process of making ice cream mix, consisting in treating the milk to separate the casein particles and enlarge the same to substantially a state of initial agglomeration, and thereafter subjecting the treated milk to a homogenizing action to arrest further agglomeration.

2. The herein described process of making ice cream mix, consisting in treating the milk to separate the casein particles and enlarge the same to a substantial state of agglomeration, thereafter subjecting the treated milk to a homogenizing action to arrest further agglomeration, and finally subjecting the treated milk to a temperature to protect it against deterioration.

3. The herein described process, consisting in subjecting the milk to the action of enzyms to separate the casein particles and enlarge the same, homogenizing the mixture to thereby break up the formation resulting from the enzymatic action, and reducing the temperature of the mixture to prevent deterioration.

4. The herein described process of treating an otherwise complete ice cream mix, consisting in adding enzyms thereto to separate the casein particles and enlarge the same, subjecting the mix to a homogenizing action following enzymatic activity, and maintaining the mix at a temperature sufficiently low to prevent deterioration.

5. The herein described process of the preparation of an ice cream mix, consisting in subjecting the milk to pasteurization, subsequently treating the milk to separate and enlarge the casein and like particles maintaining the milk under agitation to the desired degree of viscosity, and homogenizing the treated milk.

In testimony whereof I affix my signature.
ANTHONY R. SANNA.